(12) United States Patent
Millard et al.

(10) Patent No.: US 10,035,153 B2
(45) Date of Patent: Jul. 31, 2018

(54) HYDRONIC AIR SEPARATOR

(71) Applicant: SweepCLEAR, Inc., Marietta, GA (US)

(72) Inventors: Michael W Millard, Roswell, GA
(US); Roland T. Vann, Gainesville, GA
(US)

(73) Assignee: SweepCLEAR, Inc., Marietta, GA (US)

( * ) Notice: Subject to any disclaimer, the term of this patent is extended or adjusted under 35 U.S.C. 154(b) by 218 days.

(21) Appl. No.: 15/138,625

(22) Filed: Apr. 26, 2016

(65) Prior Publication Data

US 2016/0332172 A1   Nov. 17, 2016

Related U.S. Application Data

(60) Provisional application No. 62/160,873, filed on May 13, 2015.

(51) Int. Cl.
*B01D 19/00* (2006.01)
*B04C 9/00* (2006.01)
(Continued)

(52) U.S. Cl.
CPC ............ *B04C 9/00* (2013.01); *B01D 19/0005* (2013.01); *B01D 19/0057* (2013.01);
(Continued)

(58) Field of Classification Search
CPC ... B01D 21/28–21/286; B01D 21/2494; B01D 19/0005–19/0015;
(Continued)

(56) References Cited

U.S. PATENT DOCUMENTS 3,771,290 A   11/1973  Stethem
5,350,511 A   9/1982   Holmes et al.
(Continued)

OTHER PUBLICATIONS

PCT International Application No. PCT/US 16/29935; PCT International Search Report; Completion of the international search Jul. 8, 2016; dated Aug. 12, 2016.
(Continued)

*Primary Examiner* — T. Bennett McKenzie
(74) *Attorney, Agent, or Firm* — Dority & Manning, P.A.

(57) ABSTRACT

Improvements for hydronic air separators enable removal of micro bubbles of the air and micro particles of dirt. Adding coalescing media (CM) to existing and new tangential and in-line AS helps remove damaging micro air bubbles and small dirt particles from the water by a physics principle called surface adhesion. When the small air bubbles and dirt in the water come in contact with the CM, they stick to the surface of the media and then coalesce into larger bubbles and clumps of dirt. The larger air bubbles can float up off the CM and out of the water, to be released from the AS though an automatic air release valve. The larger dirt clumps fall off the CM and land at the bottom of the AS tank where they can be expelled through a hole in the AS tank connected to a drain valve. Water can be filtrated leaving the top of a separator tank. In such arrangements, material in the water with a specific gravity lower than 1.0 will float to the top of the tank and exit through a top opening in the water stream that passes through a bag filter and is removed. Clean water exiting the filter then can flow to the inlet side of a circulating pump.

20 Claims, 6 Drawing Sheets

(51) Int. Cl.
    *B01D 21/28*     (2006.01)
    *B01D 21/24*     (2006.01)
    *B01D 21/26*     (2006.01)

(52) U.S. Cl.
    CPC ....... *B01D 21/2494* (2013.01); *B01D 21/267* (2013.01); *B01D 21/28* (2013.01)

(58) Field of Classification Search
    CPC .......... B01D 19/0042–19/0057; B01D 46/003; B01D 46/0031; B04C 9/00; B04C 2009/004
    See application file for complete search history.

(56) References Cited

U.S. PATENT DOCUMENTS

| | | |
|---|---|---|
| 4,390,351 A | 6/1983 | Matsui et al. |
| 4,555,253 A | 11/1985 | Hull et al. |
| 7,465,391 B2 | 12/2008 | Heist et al. |
| 2005/0155925 A1* | 7/2005 | Schipper ............ B01D 19/0005 210/497.1 |

OTHER PUBLICATIONS

PCT International Application No. PCT/US 16/29935; PCT Written Opinion of the International Searching Authority; Date of completion of Opinion Jul. 8, 2016; dated Aug. 12, 2016.

* cited by examiner

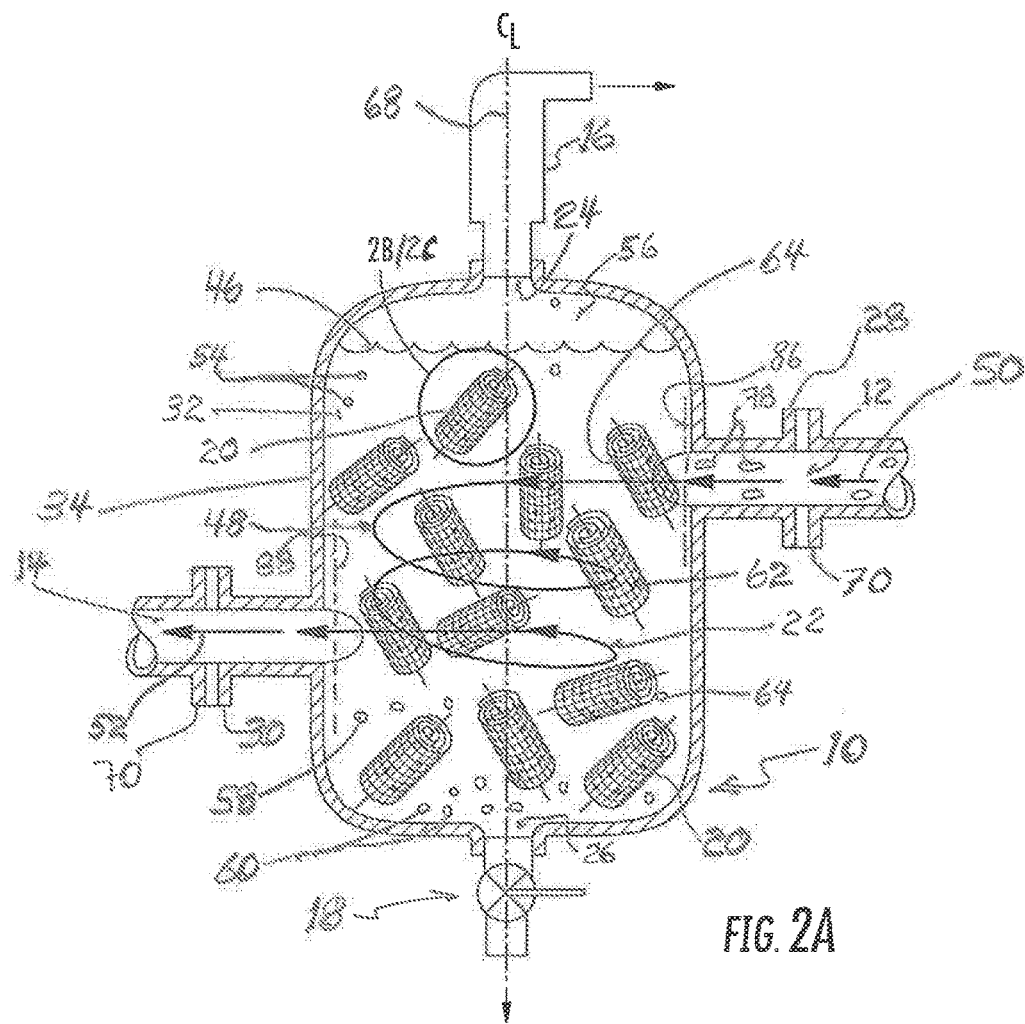
FIG. 2A
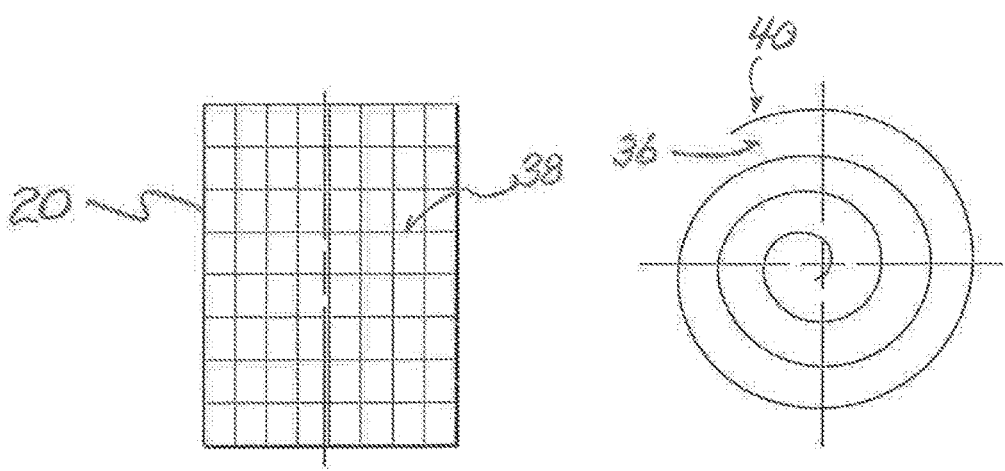
FIG. 2B
FIG. 2C

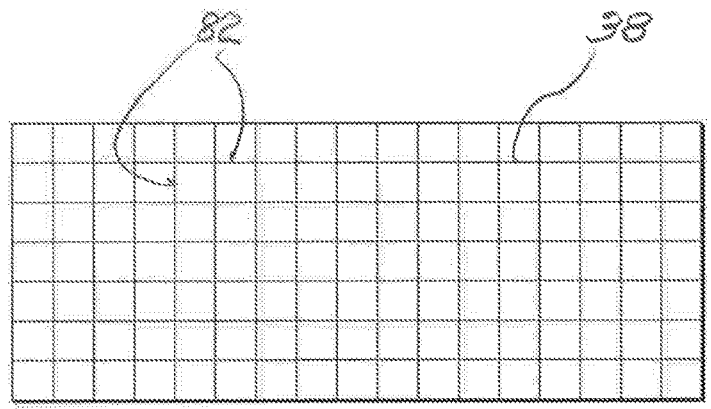
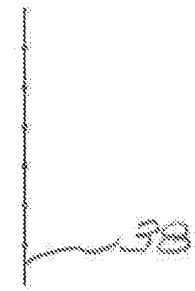
FIG. 3A  FIG. 3B
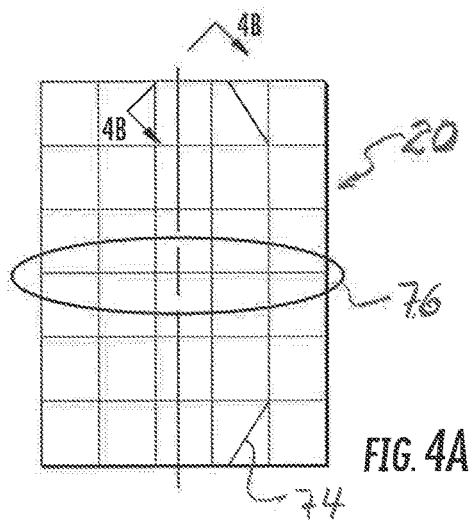
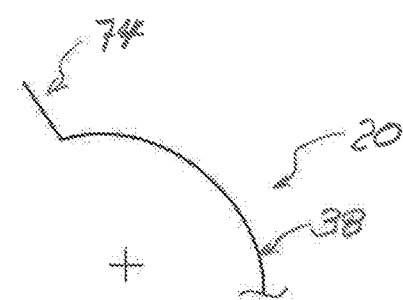
FIG. 4A  FIG. 4B
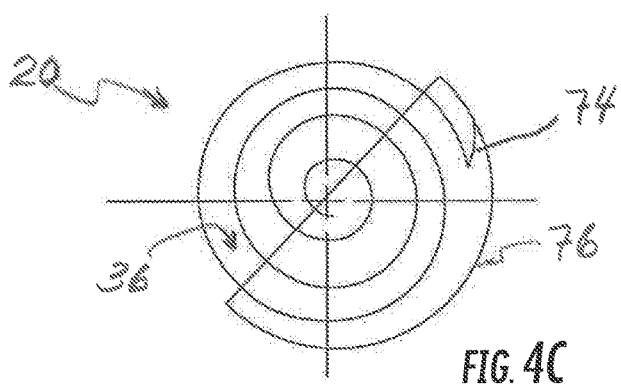
FIG. 4C

HYDRONIC AIR SEPARATOR

PRIORITY CLAIM

This application claims the benefit of previously filed U.S. Provisional Patent Application entitled "IMPROVED HYDRONIC AIR SEPARATOR," assigned U.S. Ser. No. 62/160,873, filed May 13, 2015, and which is incorporated herein by reference for all purposes.

FIELD OF THE SUBJECT MATTER

The presently disclosed subject matter relates to air separators. More particularly, the presently disclosed subject matter relates to improvements for hydronic air separators to enable removal of micro bubbles of air and micro particles of dirt.

BACKGROUND OF THE SUBJECT MATTER

Generally speaking, previously existing hydronic tangential and in-line air separators (AS) do not remove air from water to a low enough level to prevent corrosion in pipes and other system components. Micro bubbles remain in the water after free and entrained air has been removed by a standard AS. Micro air bubbles can account for up to 10% of the water by volume, depending on the water temperature and pressure. ASHRAE states that water with 1% or more air will cause pipes to corrode, and hydronic ASs do not remove particles in the water with specific gravity greater than one. The particles are generally referred to as dirt, and can clog hydronic system components like heat exchangers, boiler and chiller tubes, temperature control valves, and air handlers.

U.S. Pat. No. 8,419,842 (Castrigno et al.) is entitled "HYDRONIC SYSTEM AIR ELIMINATOR" and discloses what it describes as an air eliminator with defined housing. Other examples of prior art systems in the patent literature include U.S. Pat. No. 8,313,658 to Cnossen; U.S. Pat. No. 8,177,975 to Schipper; U.S. Pat. No. 8,025,716 to Prisco et al.; U.S. Pat. No. 5,676,740 to Schwartz et al.; U.S. Pat. No. 4,456,456 to Pompei; U.S. Pat. Nos. 3,151,961 and 2,710,664 to Blackmore et al.; and U.S. Pat. No. 2,578,568 to Mayer et al. Another example is provided by WIPO Publication WO1996035495 by Centazzo et al. All the disclosures of the foregoing patent related publications are incorporated herein by reference for all purposes.

While various implementations of separators have been developed, no design has emerged that generally encompasses all of the desired characteristics as hereafter presented in accordance with the subject technology.

SUMMARY OF THE SUBJECT MATTER

In view of the recognized features encountered in the prior art and addressed by the presently disclosed subject matter, improved apparatus and methodology have been provided for air separators. More particularly, the presently disclosed subject matter provides improvements for hydronic air separators to enable removal of micro bubbles of the air and micro particles of dirt.

One exemplary embodiment of presently disclosed subject matter relates to a hydronic air separator, for use with a circulating or flowing fluid system for environmental control, for removing as present micro bubbles of air and micro particles of dirt from an associated fluid flow of such circulating fluid system. Such an air separator (AS) preferably comprises a tank and a plurality of respective coalescing media. Such tank preferably has an upper exhaust valve at the top of such tank, a lower drain valve at the bottom of such tank, a sidewall inlet, and a sidewall outlet, such that fluid is admitted to the tank through such inlet and flows out of such tank through such outlet, with such inlet and such outlet relatively positioned so that centrifugal force of fluid flow in such tank creates a flow vortex within such tank. Such plurality of respective coalescing media preferably have respective surfaces and are trapped in such tank, such that micro bubbles of air and micro particles of dirt as present in the associated fluid flow when contacting such media stick to such media surfaces through surface adhesion and then coalesce into larger bubbles of air and clumps of dirt, with the larger bubbles of air floating off the media and out of the fluid to be released from such tank through such upper exhaust valve, and with the larger clumps of dirt falling off such media and onto the bottom of such tank to be expelled through such lower drain valve.

In variations of the foregoing exemplary embodiment, such fluid may comprise water; and such upper exhaust valve may comprise an automatic air release valve.

In other alternative arrangements of the foregoing, such tank may comprise one of a tangential and in-line air separator tank; and such sidewall inlet may be located above such sidewall outlet. In some instances, such sidewall inlet and such sidewall outlet may have respective flanges for connection to an associated circulating fluid system. In others, the hydronic air separator may further include elbow piping associated with such flange of such sidewall outlet to bring discharge therefrom into alignment with such flange of such sidewall inlet.

For some other presently disclosed alternatives, such plurality of respective coalescing media may comprise respective pieces of at least one of bendable fine wire mesh, perforated sheets, expanded metal, expanded plastic, and molded plastic mesh, such coalescing media pieces having large open areas to allow free fluid passage, resulting in low pressure drop across such tank inlet and outlet. In additional alternatives, such coalescing media pieces may comprise fine wire mesh pieces, respectively each comprising a continuous coil that is larger in diameter than the inside diameter of such tank inlet, and with spacing between coils equal to the opening of the mesh, so that each piece may be resiliently compressed to a size that is smaller in diameter than the inside diameter of such tank inlet.

In some instances, such coalescing media pieces may partially fill such tank, while in others such coalescing media pieces may substantially fill such tank.

For some variations, such coalescing media pieces may comprise wire mesh pieces comprising one of plastic wire mesh, fiberglass wire mesh, and metal wire mesh.

Per some presently disclosed alternatives, such plurality of respective coalescing media may comprise respective resiliently compressible coiled wire mesh sheets wrapped in a spiral and secured so as to limit expansion thereof. In some such variations, such spiral may create a space between layers of the spirals approximately equal to the opening of the mesh so the coils cannot trap air or dirt permanently; and the length of the coil may be approximately equal to the outside diameter of the coil.

For some variations of the above-described exemplary hydronic air separator, such plurality of respective coalescing media may comprise respective resiliently compressible coiled wire mesh sheets wrapped in a spiral with a corner bend in the last wrap of the spiral, to engage such sidewall inlet and outlet to prevent escape of such media from such tank. For other variations, such plurality of respective coalescing media may comprise respective bendable fine wire mesh pieces with large open areas to allow free fluid passage, and having a size that is smaller than the inside diameter of such tank inlet; and such air separator may further include screens placed over such tank outlet (and in some instances, optionally over such tank inlet) to retain such coalescing media in such tank. For yet others, such plurality of respective coalescing media may comprise respective resiliently compressible coiled wire mesh pieces, with each piece respectively comprising a bundle of smaller wire mesh coils banded together.

Another presently disclosed exemplary embodiment relates to a plurality of respective coalescing media having respective surfaces, such media for being trapped in a hydronic air separator tank having an upper exhaust valve at the top of such tank, a lower drain valve at the bottom of such tank, a sidewall inlet, and a sidewall outlet selectively positioned relative to such sidewall inlet, such that fluid admitted to the tank through such inlet and flowing out of the tank through such outlet creates a flow vortex due to centrifugal force of fluid flow in such tank. Preferably, such media surfaces are exposed to fluid flow within such tank such that micro bubbles of air and micro particles of dirt as present in the associated fluid flow when contacting such media adhere to such media surfaces through surface adhesion and then coalesce into larger bubbles of air and clumps of dirt, with the larger bubbles of air floating off the media and out of the fluid to be released from such tank through the upper exhaust valve thereof, and with the larger clumps of dirt falling off such media and onto the bottom of such tank to be expelled through the lower drain valve thereof.

In some variations of the foregoing exemplary embodiment, such plurality of respective coalescing media may comprise respective bendable fine wire mesh pieces with large open areas to allow free fluid passage, resulting in low pressure drop across the associated tank inlet and outlet. For some such variations, such fine wire mesh pieces may respectively each comprise a continuous coil that is larger in diameter than the inside diameter of the associated tank inlet, and with spacing between coils equal to the opening of the mesh, so that each piece may be resiliently compressed to a size that is smaller in diameter than the inside diameter of the associated tank inlet. In other exemplary alternatives thereof, such wire mesh pieces may comprise one of plastic wire mesh, fiberglass wire mesh, metal wire mesh, perforated sheets, expanded metal, expanded plastic, or molded plastic mesh.

In other alternative embodiments of such exemplary plurality of respective coalescing media, such media may comprise respective resiliently compressible coiled wire mesh sheets wrapped in a spiral and secured so as to limit expansion thereof. Per some such alternatives, such spiral may create a space between layers of the spirals approximately equal to the opening of the mesh so the coils cannot trap air or dirt permanently; and the length of the coil is approximately equal to the outside diameter of the coil.

Yet for other presently disclosed variations, such plurality of respective coalescing media may comprise respective resiliently compressible coiled wire mesh sheets wrapped in a spiral with a corner bend in the last wrap of the spiral, to engage the associated sidewall inlet and outlet to prevent escape of such media from the associated tank. For others, such plurality of respective coalescing media may comprise respective bendable fine wire mesh pieces with large open areas to allow free fluid passage, and having a size that is smaller than the inside diameter of the associated tank inlet; and screens may be placed over the associated tank inlet and tank outlet to retain such coalescing media in the associated tank.

Some alternatives of such plurality of respective coalescing media may comprise respective resiliently compressible coiled wire mesh pieces, with each piece respectively comprising a bundle of smaller wire mesh coils banded together.

Those of ordinary skill in the art will understand from the complete disclosure herewith that the present subject matter equally relates to apparatus as well as associated and/or corresponding methodology. One presently disclosed exemplary embodiment, relates to methodology for improving a hydronic air separator, for use with a circulating fluid system for environmental control, for removing micro bubbles of air and micro particles of dirt as present from an associated fluid flow of such circulating fluid system, such air separator of the type including a tank having an upper exhaust valve at the top of such tank, a lower drain valve at the bottom of such tank, a sidewall inlet, and a sidewall outlet selectively positioned relative to such sidewall inlet, such that fluid admitted to the tank through such inlet and flowing out of the tank through such outlet creates a flow vortex within such tank due to centrifugal force of fluid flow in such tank. Such exemplary methodology may comprise providing a plurality of respective coalescing media having respective surfaces thereof; and trapping such media in such tank, such that micro bubbles of air and micro particles of dirt in the associated fluid flow when contacting such media stick to such media surfaces through surface adhesion and then coalesce into larger bubbles of air and clumps of dirt, with the larger bubbles of air floating off such media and out of the fluid to be released from such tank through the upper exhaust valve thereof, and with the larger clumps of dirt falling off such media and onto the bottom of such tank to be expelled through the lower drain valve thereof.

In particular variations of such methodology, such fluid may comprise water; and such upper exhaust valve may comprise an automatic air release valve. In others, such tank may comprise one of a tangential and in-line air separator tank; and such sidewall inlet may be located above such sidewall outlet. In some such variations, such sidewall inlet and sidewall outlet may have respective flanges for connection to an associated circulating fluid system; and such trapping may include disconnecting at least one of such sidewall inlet and sidewall outlet from its respective flange, inserting such media into such tank, and reconnecting the respective flange. Further, per some alternatives, such trapping may further include associating elbow piping with such flange of such sidewall outlet to bring discharge therefrom into alignment with such flange of such sidewall inlet. Still further alternatively, such inserting may include one of at least partially filling such tank with such media, and substantially filling such tank with such media.

In other presently disclosed variations of such methodology, such plurality of respective coalescing media may comprise respective pieces of at least one of bendable fine wire mesh, perforated sheets, expanded metal, expanded plastic, and molded plastic mesh, such coalescing media pieces having large open areas to allow free fluid passage, resulting in low pressure drop across such tank inlet and outlet. In some such alternatives, such coalescing media pieces may comprise fine wire mesh pieces, respectively each comprising a continuous coil that is larger in diameter than the inside diameter of such tank inlet, and with spacing between coils equal to the opening of the mesh, so that each piece may be resiliently compressed to a size that is smaller in diameter than the inside diameter of such tank inlet. For further variations, such coalescing media pieces may comprise wire mesh pieces comprising one of plastic wire mesh, fiberglass wire mesh, and metal wire mesh.

In other variations, such plurality of respective coalescing media may comprise respective resiliently compressible coiled wire mesh sheets wrapped in a spiral and secured so as to limit expansion thereof. For some, such spiral may create a space between layers of the spirals approximately equal to the opening of the mesh so the coils cannot trap air or dirt permanently; and the length of the coil may be approximately equal to the outside diameter of the coil.

Per other presently disclosed methodology variations, such plurality of respective coalescing media may comprise respective resiliently compressible coiled wire mesh sheets wrapped in a spiral with a corner bend in the last wrap of the spiral, to engage such sidewall inlet and outlet to prevent escape of such media from such tank. For others, such plurality of respective coalescing media may comprise respective bendable fine wire mesh pieces with large open areas to allow free fluid passage, and having a size that is smaller than the inside diameter of such tank inlet; and such air separator may further include screens placed over such tank inlet and such tank outlet to retain such coalescing media in such tank.

Per still other variations in such exemplary methodology, such plurality of respective coalescing media may comprise respective resiliently compressible coiled wire mesh pieces, with each piece respectively comprising a bundle of smaller wire mesh coils banded together.

In accordance with some broader aspects of the presently disclosed subject matter, adding coalescing media (CM) to a tangential and in-line AS helps remove damaging micro air bubbles and small dirt particles from the water by a physics principle called surface adhesion. When the small air bubbles and dirt in the water come in contact with the CM, they stick to the surface of the media and then coalesce into larger bubbles and clumps of dirt. The larger air bubbles can float up off the CM and out of the water, to be released from the AS though an automatic air release valve. The larger dirt clumps fall off the CM and land at the bottom of the AS tank where they can be expelled through a hole in the AS tank connected to a drain valve.

In certain broader present aspects, this presently disclosed subject matter adds coalescing media (CM) to centrifugal and in-line AS with the CM added either before the AS tank is assembled, after it is assembled, or after it has been placed into service.

In some embodiments, a preferred CM is a fine wire mesh with large open areas to allow free water passage, resulting in low pressure drop across the inlet and outlet connections to the AS tank. In some such preferred CM fine wire mesh, the mesh is rolled into a continuous coil that is slightly larger in diameter than the inside of the tank's inlet pipe and with spacing between coils equal to the opening of the mesh. The coil's length may preferably in some embodiments be equal to the diameter with large open areas to allow free water passage, resulting in low pressure drop across the inlet and outlet connections to the AS tank. The wire mesh coils may be installed into the tank through the inlet nozzle opening and may spring open slightly once inside the tank, preventing them from exiting the tank. Multiple mesh coils may preferably be inserted in the tank until the tank is full of wire mesh coils. The CM could also be installed before the AS tank is assembled.

Certain embodiments of the presently disclosed subject matter combines two air separating techniques that have not been used together before, resulting in an improved air and dirt separator. A conventional tangential AS uses the first technique—centrifugal force inside the AS tank—to cause the air and dirt to separate from the water by migrating to the center vortex, which has lower pressure and water velocity created by the tangential water flow into and out of the tank. The lower pressure allows the air to be released and float to the top of the tank where it is removed by an automatic air release valve. The lower water velocity allows the dirt particles to fall out of the water stream and land at the bottom of the tank where they can be flushed out. The second technique is the addition of the CM to an AS tank to remove air and dirt from the water stream. The CM impedes the flow of water causing the water to slow down, allowing air bubbles to float up and out of the water and dirt particles to fall out of the water to the bottom of the tank. The CM helps remove micro air bubbles and small dirt particles from the water by a physics principle called surface adhesion, as otherwise described herein.

A conventional tangential AS does not have a means of removing corrosion-causing micro air bubbles dissolved in hydronic water or fine dirt particles. A CM-style AS can remove micro bubbles and dirt but is costly to retrofit to systems that do not have them, with or without a conventional tangential AS and causes a high pressure drop. And they are larger than conventional tangential AS and may not fit in many applications. CM-style AS have supporting tubes or pipes that impede the flow of water through the AS, resulting in such high pressure drop which consumes more energy.

Other alternatives provide for filtration of water leaving the top of the separator. In such arrangements and corresponding methodology, material in the water with a specific gravity lower than 1.0 will floats to the top of the tank and exits through a top opening in the water stream that passes through a bag filter and is removed. Clean water exiting the filter then can flow to the inlet side of a circulating pump.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which:

FIG. 2A is a partial cross-sectional view of an exemplary embodiment in accordance with the presently disclosed subject matter;

FIGS. 2B and 2C are side and top views (enlarged), respectively, of a detail portion of FIG. 2A, as indicated therein;

FIGS. 3A and 3B are top perspective and end views, respectively, of an exemplary embodiment in accordance with the presently disclosed subject matter;

FIG. 4A is a side view of an exemplary embodiment in accordance with the presently disclosed subject matter, and illustrating a section line B-B as shown therein;

FIG. 4B is a partial sectional view of FIG. 4A, taken along section line B-B as shown therein;

FIG. 4C is a bottom perspective view of FIG. 4A;

Figure 1A:
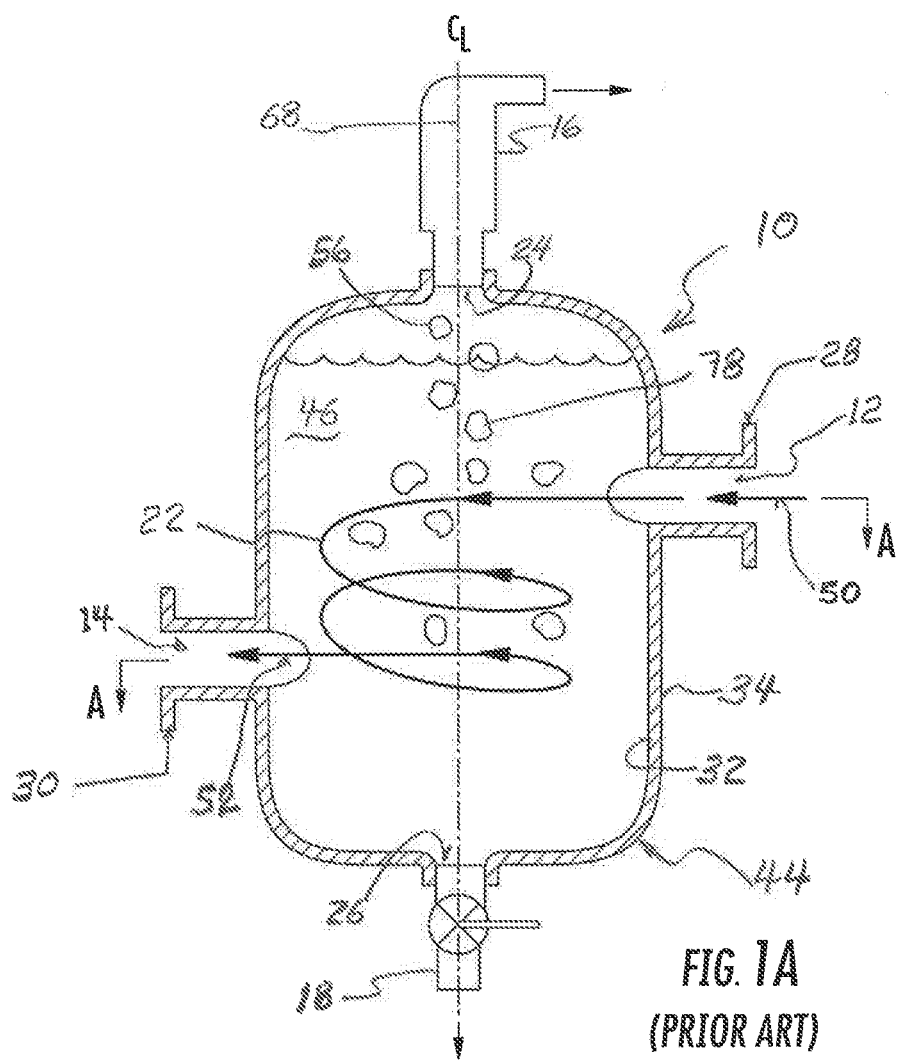
FIG. 1A is a partial cross-sectional view of a Prior Art embodiment, and illustrating a further section line A-A as shown therein.
Figure 1B:
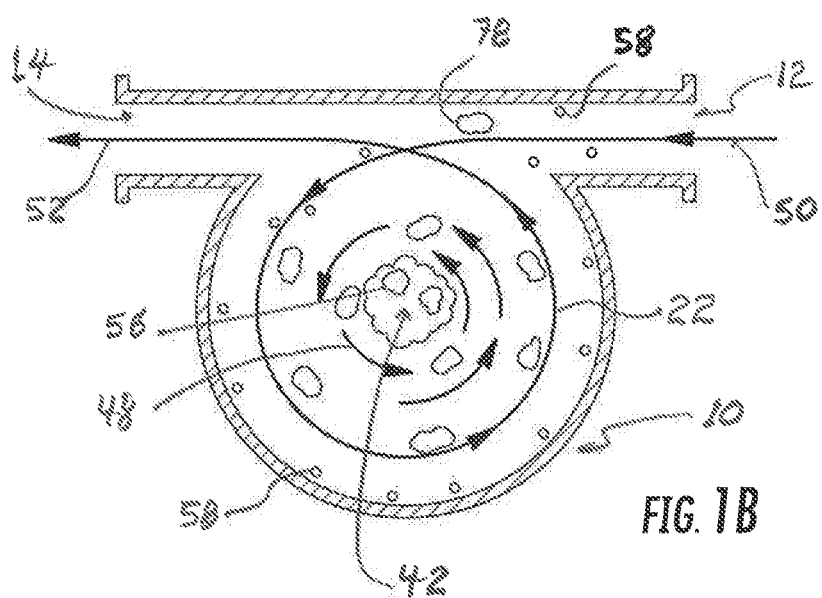
FIG. 1B is a further sectional view of FIG. 1A, taken along section line A-A as shown therein.
Figure 5:
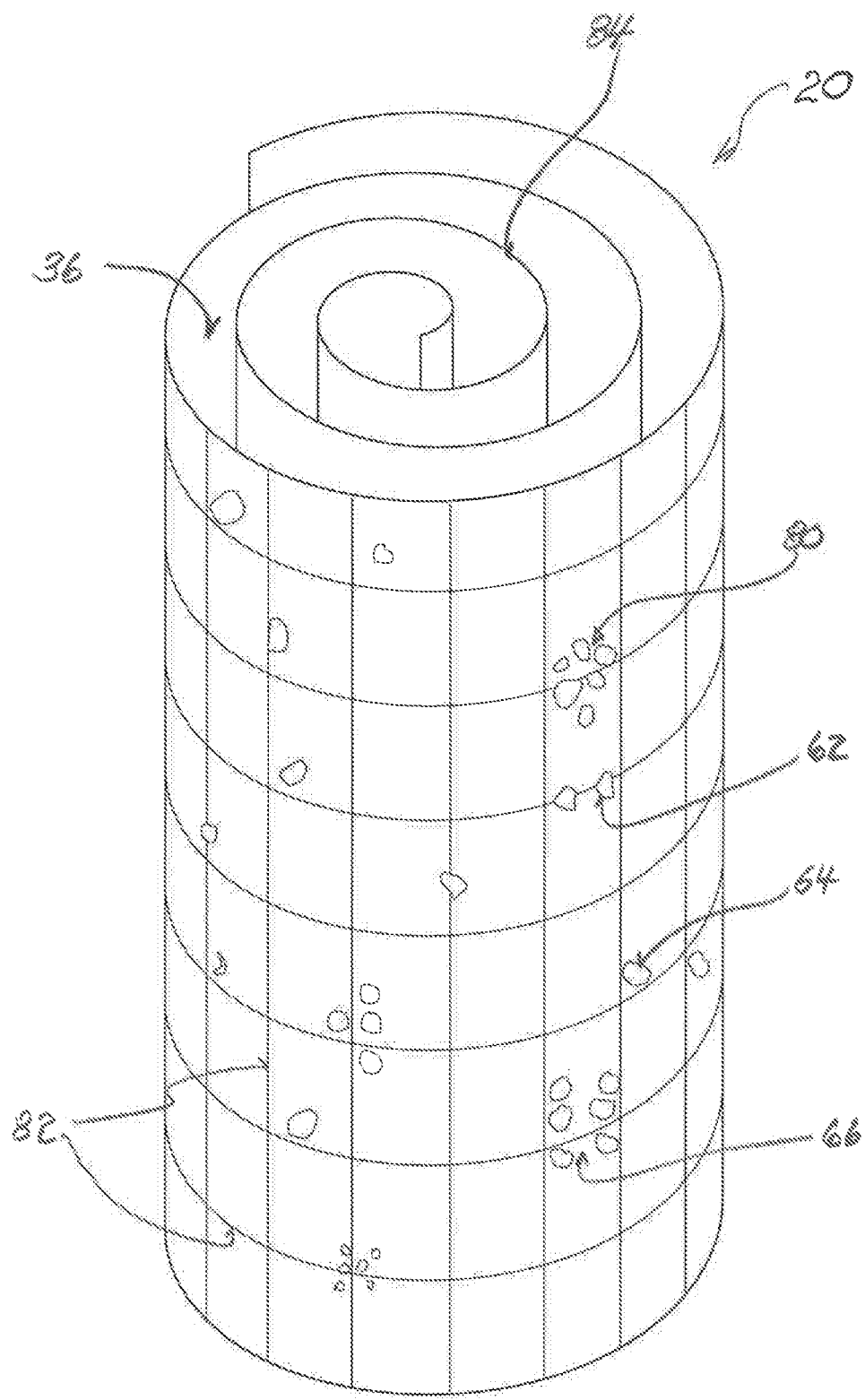
FIG. 5 is a generally top and front perspective view of an exemplary embodiment in accordance with the presently disclosed subject matter

Repeat use of reference characters throughout the present specification and appended drawings is intended to represent same or analogous features, elements, or steps of the presently disclosed subject matter.

DETAILED DESCRIPTION OF THE PREFERRED EMBODIMENTS

As discussed in the Summary of the Subject Matter section, the presently disclosed subject matter is particularly concerned with improved apparatus and provided for air separators. More particularly, the presently disclosed subject matter provides improvements for hydronic air separators to enable removal of micro bubbles of the air and micro particles of dirt.

Selected combinations of aspects of the disclosed technology correspond to a plurality of different embodiments of the presently disclosed subject matter. It should be noted that each of the exemplary embodiments presented and discussed herein should not insinuate limitations of the presently disclosed subject matter. Features or steps illustrated or described as part of one embodiment may be used in combination with aspects of another embodiment to yield yet further embodiments. Additionally, certain features may be interchanged with similar devices, features, or steps not expressly mentioned which perform the same or similar function.

Reference will now be made in detail to the presently preferred embodiments of the presently disclosed subject matter. An outline of referenced subject matter and associated reference characters appears at the end of this specification.

In an exemplary embodiment of the presently disclosed subject matter, the typical hydronic tangential or in-line AS is comprised of a body 44-18 which is a tank 10-1 with an inside 32-12 and outside 34-13 such that it will hold water 46-19. Water enters the AS through an inlet nozzle 12-2 and exits though an outlet nozzle 14-3 which on a tangential AS located on the outside of the tank tangential to the vertical center line of the tank 68-30. The tank's inlet nozzle 12-2 is typically located above the outlet nozzle 14-3. Each nozzle 12 and 14 are typically connected the rest of the piping system 70 by flanges 28 and 30. Water will flow 50 into the tank 10, and swirl around the inside 32 of the tank while passing through the CM 20. The denser entrained air-free water will be forced to the wall of the separator 10 due to centrifugal force. The swirling motion of the water in the tank 10 causes a vortex 48 at the vertical center line 68 of the tank which has a lower water pressure than the water near the wall of the tank. This pressure drop allows the release of air from the water. Less dense air 78 entrained in the water flow 50 will gather at the vortex and rise to the top of the tank 10.

The air at the top of the tank will exit the tank through the hole 24 in the top of the tank 10 when the air release valve 16 opens. Dirt 58 in the water moves to the outside of the tank 10 though centrifugal force and swirls to the bottom of the tank where it will exit though the hole 26 in the bottom of the tank when the drain valve 18 is opened.

This presently disclosed subject matter places CM 20 inside the AS tank 10 by breaking the flanged 28 connections at the tank and piping flange 70 and offsetting the tank flange from the piping flange 70 to allow insertion of the CM 20 until the tank 10 is full or partially full of media 20. Once the tank is full of CM 20, it will act as a coalescing air separator (AS) with the benefit of the water flow of a tangential AS 10.

One preferred exemplary design for the CM 20 is coiled wire mesh sheets 38 made from stainless steel or copper wire with 0.25" openings and wrapped in a spiral so there is 0.25" between coils. The spiral shape is maintained by inserting a wire 76 through the spiraled coil 84 and wrapping it 76 around the outside of the spiral coil 84 then tying the wire 76 off. The wire 76 could be replaced by any device that can maintain the coils' spiral shape and not impede water flow through the coil. The CM 20 filling the tank causes the tangential AS 10 to act as a coalescing AS. The CM 20 forces the water to slow down due to flow resistance of the wire mesh 38 which disperses the water flow 50 into the tank 10, causing the air and dirt to separate from the water. The air rises to the top of the AS 10 and exits through the hole 24 in the AS 10 when the air release valve 16 opens, while the dirt 58 settles 60 to the bottom of the AS 10 and exits through the hole 26 in the bottom of the AS 10 when the drain valve 18 opens.

The CM 20 also attracts the micro air 54 bubbles in the water 46 and pulls them out of the water 46 through a process called surface adhesion. The micro bubbles 54 adhere to the wire 82 in the CM 20. The micro bubbles 54 begin to coalesce 64 on the wire 82 in the CM 20 and when large enough float off the CM 20 to the top of the AS 10 where they are released through the hole 24 in the tank when the air release valve 16 opens. This method of air removal uses Henry's Law of air release from a body of water. The AS 10 is placed in the water stream where the temperature is the highest and pressure is the lowest, and the maximum amount of air is released.

Fine dirt particles 58 are also removed by surface adhesion to the wire 82 in the CM 20 and coalesce into larger particles that become dense enough to break loose from the wire 82 and fall to the bottom of the AS tank 10.

Once the mesh coils 20 are inserted into the tank 10, they cannot escape because the free coil diameter is larger than the inlet 12 nozzle opening. To insert the coils 20 they have to be slightly compressed and coiled tighter, but once inside the tank they spring open to a larger diameter. Another method to keep the mesh coils 20 in the AS tank 10 is to bend the corners 74 of the last wrap of the mesh coil 20 up on a 45-degree angle making the mesh coil 20 larger than the inlet 12 inside diameter. The corner 74 would be pushed down to insert the mesh coil 20 into the inlet 12 but would spring back once inside the AS tank 10, making it larger than the inlet 12 pipe inside diameter. Therefore it would be trapped inside the tank 10.

Adding wire mesh coils of CM to fill or partially fill the inside of a hydronic tangential or in-line AS tank improves its air and dirt removal performance to the level of a coalescing AS. A tangential conventional hydronic tangential or in-line AS's air and dirt separator techniques use the centrifugal force of the water swirling inside the tank due to the position of the inlet and outlet water nozzles, but it cannot remove micro air bubbles in the water. Adding CM allows the hydronic tangential or in-line AS to remove micro air bubbles which cause corrosion and block heat transfer, the primary function of the water in a hydronic system. This is a significant improvement resulting in higher air removal rates over a hydronic tangential or in-line AS. The CM also aids in the removal of dirt in the water by slowing down the water in the tank by adding friction to the water path while the media attracts the dirt to attach to the wire surface, which then coalesces and drops to the bottom of the tank.

Using spiral coils of wire mesh that are the diameter of the tank's inlet nozzle and as long as the diameter allows an AS tank to be retrofitted with CM by only having to separate the connecting pipes, allowing access to the inside of the tank.

The spiral wound coils are designed to compress during installation through the nozzle but spring open to a larger diameter once inside the tank—which means they will be trapped inside and cannot come loose from the tank. The spiral shape creates a space between layers of the spirals approximately equal to the opening of the mesh so the coils cannot trap air or dirt permanently. A hydronic tangential or in-line AS tank with the mesh coil media inserted will be self-cleaning of air and dirt. The air will escape the hydronic tangential or in-line AS tank through an air release valve in the top of the tank, and the heavier dirt that settles in the bottom of the tank is purged through the tank's bottom drain valve.

Shapes other than spiral wound coils could be used, such as squares or rounds made from fine wire, to create openings for the water flowing through the tank to pass though. They could be made to compress during installation though the tank nozzle and spring back to a larger size once inside the tank, causing them to be trapped inside. They could also be smaller than the nozzle opening, in which case a screen 86 and/or 88 (see FIG. 2A) has to be placed over the inlet and outlet nozzles to keep the smaller CM in the tank.

This presently disclosed subject matter adds CM to hydronic centrifugal AS. The CM is made and inserted in the following manner. Take a sheet of wire mesh, preferably made from 0.027" diameter 304 Stainless Steel welded wire, and cut it to a size that when rolled up in a coil with ¼" spaces between wraps results in a coil with the outside diameter equal to the inside diameter of the pipe leading into a centrifugal AS in a hot, chilled or condenser water system. The length of the coil should be equal to the outside diameter of the coil. Once rolled up to the aforementioned diameter, a wire is inserted through the center of the coil perpendicular to the axis, and is then wrapped around the outside diameter inserted again perpendicular to the first wire in a criss-cross pattern, and the ends are tied together. The wire keeps the coil from unraveling. The corners of the last wrap are bent upward from the center of the coil, forming ears. The ears make the coil's outside diameter larger than the inside diameter of the pipe, and keep the coil from exiting the AS once they are inserted.

To insert the coil, the ear should be pushed down until it is lower than the inside diameter of the pipe. Once inside the AS, the ear should spring out, preventing the coil from exiting. Coils should be rolled up, wire tied and inserted into the AS until the inside of the AS is full of coils. An alternative method of making the CM is to roll the wire mesh into a coil slightly larger than the opening of the tank's inlet pipe and not wire tie it. The untied coil would be springy and want to maintain its shape, which is larger than the inside diameter of the pipe. It should be compressed slightly to be inserted into the pipe, and once inside, it should spring open to its natural diameter—which is larger than the inside diameter of the inlet pipe, making it too large to fit through the pipe and exit on its own. On AS over 12", the CM could be made from bundles of smaller wire mesh coils banded together with wire or strapping, instead of one large coil.

The AS has a water inlet pipe, outlet pipes and an air release valve on the top and a drain valve on the bottom. The inlet pipe needs to be separated from the main piping system to the tank to allow an opening big enough to insert the CM mesh coils. Once the media is randomly inserted into the AS, the AS will be able to micro bubbles of air and small dirt particles though surface adhesion to the wire mesh and coalescing of bubble and dirt particles to one another.

Air rises to the top of the AS tank and is released through the automatic air vent. Dirt settles to the bottom of the AS tank and is released through the drain valve.

The CM mesh can be made from materials other than 0.027" diameter welded wire 304 stainless steel with ¼" mesh openings. The material, size of wire and openings and the geometry of the wire can be increased or decreased depending on the application. The basic shape of the media being inserted into the AS does not have to be cylindrical with a 1 to 1 aspect ratio. They could be longer or shorter than their diameter; do not have to be cylindrical; and could be square, rectangular, round or another unique shape (such as banana shaped). They can also be smaller than the inside diameter of the AS inlet pipe in which case a screen 88 across the outlet pipe would be placed to keep the media inside the AS tank.

The AS tank can be shaped in several ways, the most prominent and effective would be a tangential AS, where the inlet and outlet pipes are on the side of the tank, tangential to the vertical axis of the tank, and staggered with the inlet pipe higher than the outlet pipe. Other AS tank shapes feature inlet and outlet pipes that are lined up with the centerlines of the tank and staggered with the inlet pipe higher than the outlet pipe. The AS may or might not have internal strainer or baffles. The ideal tank for this presently disclosed subject matter is one without an internal strainer or baffles, although the presently disclosed subject matter will still work if they are present.

A hydronic centrifugal AS tank with inlet and outlet piping connected to a hydronic system for hot, chilled or condenser water is a necessary element of the presently disclosed subject matter. Coils of 304 stainless steel metal wire mesh are formed from sheets, rolled into coils, then wire tied through the middle of the coil and wrapped around the outside diameter. The outer corners of the last wrap are bent up to prevent the coils from exiting the tank once inserted. The coils of wire mesh are inserted into the AS through the inlet pipe until the inside of the tank is full of wire mesh coils. The wire mesh coils act as CM once inside the tank. Water flowing though the tank and over the wire mesh releases air and dirt molecules that are attracted to the wire mesh. An automatic air release valve mounted on the top opening of the AS tank purges air removed from the flowing water by the AS tank and the coalescing wire mesh coils. A drain valve mounted to the bottom opening allows the dirt separated from the flowing water by the AS tank and the coalescing wire mesh coils to be flushed from the tank. Optional designs for the mesh coils could include plastic wire mesh, fiberglass wire mesh, or other metals like copper or steel. The CM could take the shape of squares, rectangles or triangles, with single or multiple layers of wire mesh. The CM could also be smaller than the pipe opening to the tank in which case a screen 88 covering the discharge pipe would be required to keep the CM in the tank.

The CM can be made into shapes and from materials other than spiral wound wire mesh sheets. The ideal shape for the presently disclosed subject matter is sheets coiled into spirals with ¼" gaps between spirals until the outside diameter matches the inside diameter of the pipe leading into the AS tank. Once that size is achieved, a wire is placed through the center of the coil perpendicular to the axis and then around the outside of the coil and tied to hold the coil at the aforementioned diameter. The corners of the last wrap of mesh are bent up at a 45-degree angle about 1" from the corner. This bent corner will keep the coil from accidentally leaving the tank once it is placed inside because the outside diameter of the coil with the corner bent up is larger than the inside diameter of the tank's water exiting pipe. The preferred material for the mesh is 0.027" diameter 304 stainless steel welded wire. The coils are made from a sheet of mesh with a width equal to the inside diameter of the pipe and a length equal to the sum of the circumference of circles starting with the inside diameter of the pipe and dropping by ½" for each successive circle until the last circle is 1" diameter. Other shapes for the mesh could be rectangular, square or triangular, and lengths could be greater or less than the inside diameter of the inlet pipe. The mesh opening could be greater or less than ¼" and the material could be greater or less than 0.027" diameter. The mesh material could be made from plastic, fiberglass or other materials strong enough to hold their shape in a tank full of moving water. The mesh coils and shapes could be smaller than the pipe opening in which case a screen 88 would need to be placed over the discharge pipe opening to keep the smaller mesh pieces in the tank.

The CM could take on other forms like a spiral brush or a ball of wound wire with ¼" openings. On AS over 12", the CM could be made from bundles of smaller wire mesh coils banded together with wire or strapping, instead of one large coil.

This presently disclosed subject matter improves the air and dirt removal performance of hydronic AS that does not have CM. The presently disclosed subject matter retrofits CM into an AS tank by inserting the media through the tank's water inlet opening. Once the inside of the tank is filled or partially filled with media, the air removal performance of the separator will be improved. The circulated water is used to heat and cool buildings. The AS, with CM added, will solve the problem of micro bubbles of air in the water causing corrosion of the pipes conveying the water in the hydronic system. Micro bubbles in the water are created when the water is heated and when fresh, make-up water is added to the system. Free water contains approximately 10% air, which causes corrosion. Corrosion of the pipes results in leakage when they rust through, and the rust generated by corrosion is transported by the water and clogs heat exchangers, valves, boilers, chillers and ruins pump seals. The CM in the tank removes micro bubbles of air in the water being pumped through the tank by surface adhesion. The tiny air bubbles in the water, when they come into contact with the CM, stick to the media and are pulled from the water. The micro bubbles continue to be pulled from the water until the water becomes air-free, 99.6% free of air by volume, based on Henry's Law. Once the micro bubbles are stuck to the media they coalesce into larger bubbles that release from the media and float to the top of the tank where they are released into the atmosphere though a hole in the top of the tank by an automatic air release valve. Once the air is removed from the water the pipes will stop corroding.

The CM in the tank will also aid in the removal of dirt in the water. Dirt is typically the rust generated from the pipe corroding from contact with the air in the water. The CM in the tank removes dirt, in the water being pumped through the tank, by surface adhesion. The tiny dirt particles in the water, when they come into contact with the CM, stick to the media and are pulled from the water. The dirt particles continue to be pulled from the water until the water becomes free of dirt particles larger than 10 microns. Once the dirt particles are stuck to the media they coalesce into larger particles that release from the media and sink to the bottom of the tank where they are released through a hole in the bottom of the tank by a blow down valve. Once the dirt is removed from the water, the system components will be clean and not clogged.

The CM in the tank also acts as a flow diffuser that slows down and disperses the flow inside the AS tank. Once the flow is slowed, larger air bubbles are released to bubble up and out of the tank through the hole and air release valve. And once the flow is slowed, the larger dirt particles will sink to the bottom of the tank to be blown down through a hole in the bottom of the tank when the blow down valve is opened.

The presently disclosed subject matter solves the problem of how to add CM to an AS. The media is rolled into spiral cylinders and wired so they remain round with spirals spaced at ¼ to ½ in gaps. The length of the cylinder is equal to the diameter of the cylinder. And the diameter of the media cylinder is slightly smaller than the inside diameter of the tank's inlet pipe so it will pass through and into the tank when inserted. The corners of the outside wrap of the coil are bent up on a 45-degree angle for 1 inch. They can be pushed down to match the outside diameter of the coil but will spring back once inside the tank. When they spring back, the outside of the coil is no larger than the inside diameter of the inlet pipe and therefore the coil cannot exit the tank. The CM coils are trapped inside the tank since it would be detrimental to the hydronic system if they escaped.

The CM coils are made from a mesh, preferably comprised of 304 stainless steel welded 0.027 inch diameter wire, spaded on ¼ inch intervals to form a ¼ inch square opening. Other materials, wire sizes and openings would also work. Other shapes, sizes and lengths of coils would also work.

This presently disclosed subject matter can be used to remove air and dirt from any liquid, not just in a hydronic system. Any process that needs to clean a liquid of air and dirt or just air or dirt would benefit from this presently disclosed subject matter. Examples would be potable water systems, well water systems and drink processing.

This presently disclosed subject matter acts as a separator to remove gases and solids from flowing liquids. It could also be used to remove solids from flowing gases. A vessel is needed to hold the CM. The vessel can be made from carbon steel, stainless steel, fiberglass, plastic or any material strong enough to contain the liquid. The vessel needs inlet and outlet openings to allow the liquids to flow in and out of the vessel. The CM can be made from fine wire mesh rolled into coils. The mesh can be made from 0.027" diameter 304 stainless steel welded or woven wire, in a ¼" spacing. Other mesh materials could be fiberglass, plastics or any material that can be made into a fine wire and woven into a mesh. The shape of the CM does not have to be a rolled coil. The mesh could be folded into squares, rectangles, triangles or any other shape that will fit into the inlet pipe of the tank. The CM could be made from any material with a large open area to allow easy passage of the fluid but with surfaces that attract air and dirt molecules and diffuse the fluid flow.

Figure 6:
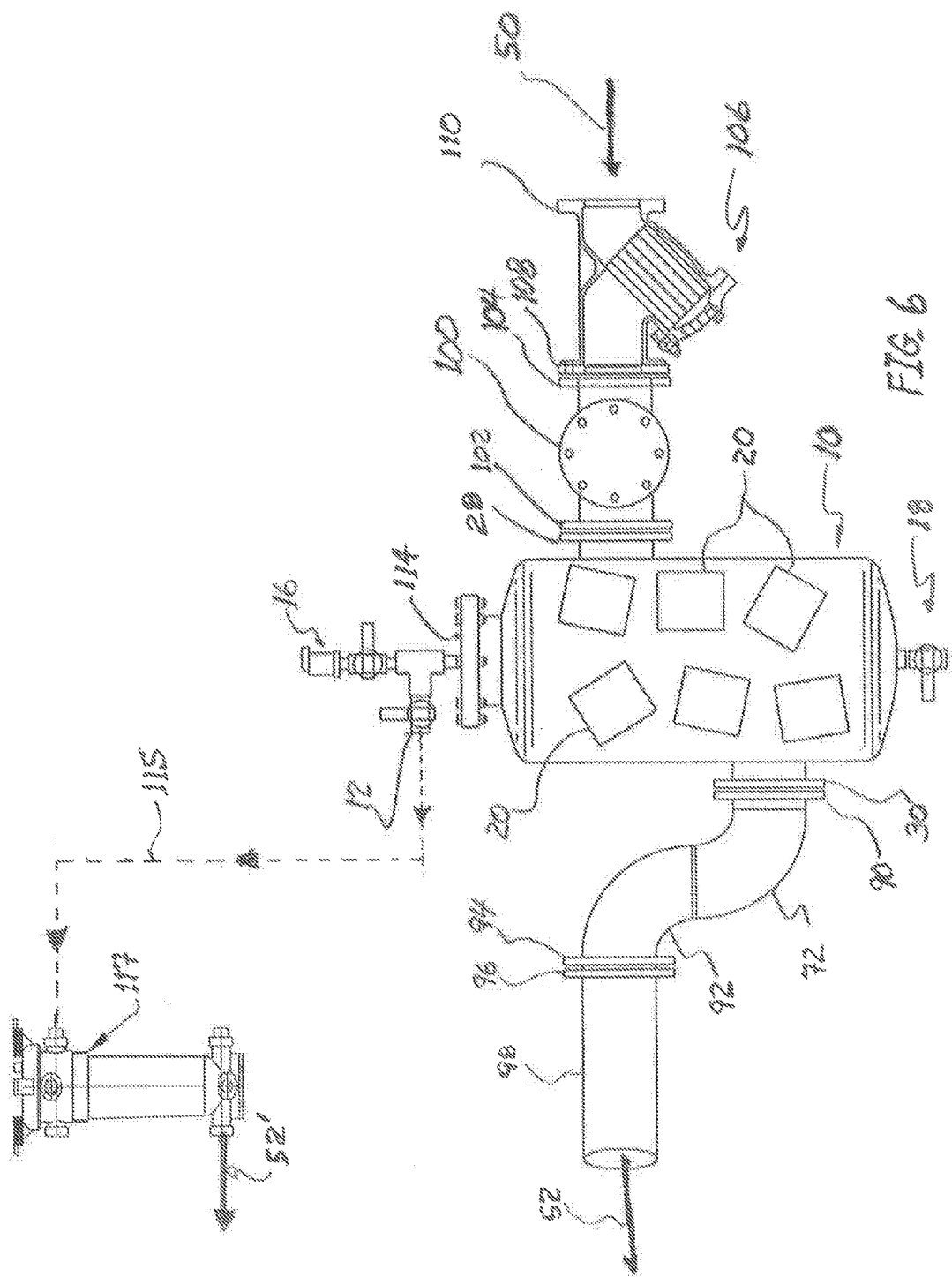
FIG. 6 is a generally side perspective view, in partial see-through, of another exemplary embodiment in accordance with the presently disclosed subject matter.
Figure 7A:
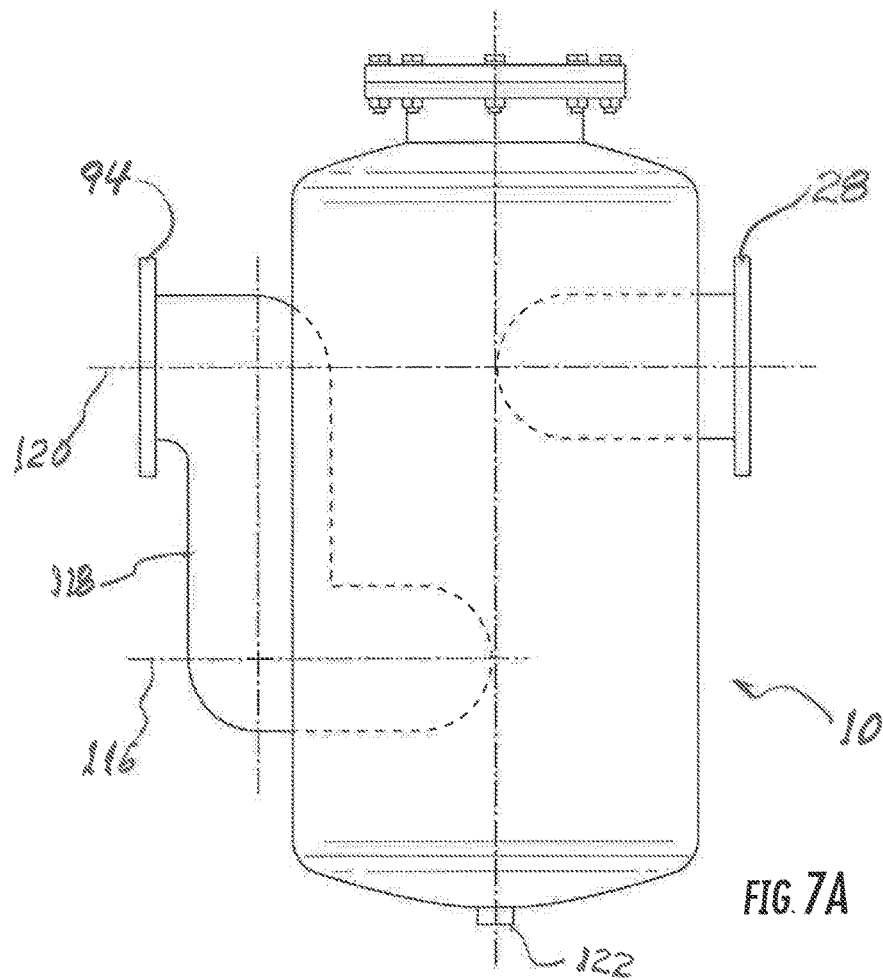
FIG. 7A is an enlarged, partial view of the exemplary embodiment which is a variation of the exemplary embodiment of present FIG. 6, with partial dotted-line representation.
Figure 7B:
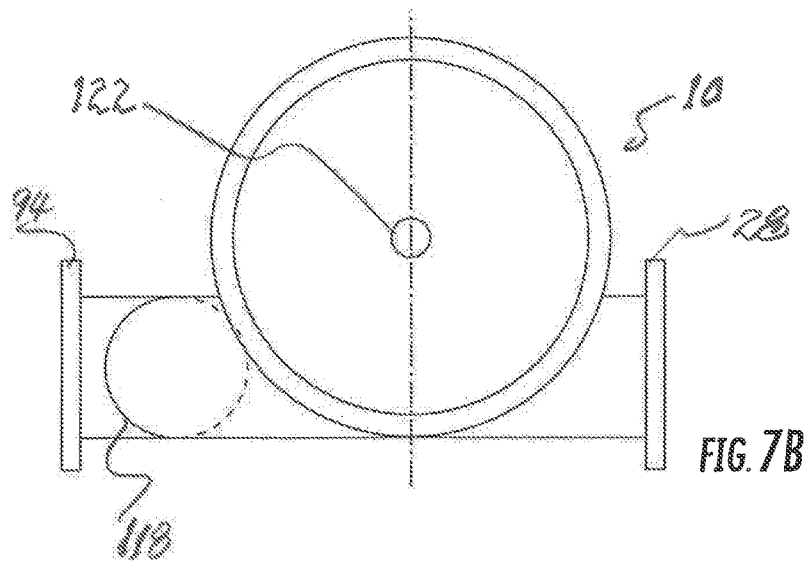
FIG. 7B is a generally bottom view of the exemplary embodiment of present FIG. 7A, with partial dotted-line representation.

FIG. 6 is a generally side perspective view, in partial see-through, of another exemplary embodiment in accordance with the presently disclosed subject matter. For example, tank generally 10 may include one or more CM 20 in accordance with presently disclosed subject matter. The tank arrangement is such, whether original or retrofit, that the inlet and outlet pipes are caused to line up by use of additional piping pieces, such as elbow sections. FIG. 7A is an enlarged, partial view of an exemplary embodiment which is a variation of the exemplary embodiment of present FIG. 6, with partial dotted-line representation, FIG. 7B is a generally bottom view of the exemplary embodiment of present FIG. 7A, with partial dotted-line representation.

With reference to such FIG. 6, tank generally 10 may have inflow 50 and outflow 52 aspects per associated piping, which includes connections to respective input and output piping flanges 28 and 30, respectively. At the outflow side of the arrangement, an additional section of piping (elbow section 72) has its own mating flange 90 for interaction with outflow flange 30, as understood by those of ordinary skill from the present disclosure and accompanying figures.

As further shown, elbow 72 further connects with an additional elbow 92 (arranged with an opposite curvature to that of elbow 72), so that the alignment of outflow 52 is brought into alignment with the inflow 50. Elbow 92 has its own flange 94 which further connects with flange 96 or representative outflow pipe section 98.

The inflow side may have an optional T-inspection piece generally 100, which has its own flange 102 in cooperation with inflow flange 28, and its own distal flange 104. Still further, an optional Y-strainer piece generally 106 may have its own respective inboard and outboard flanges 108 and 110. Flange 108 cooperates with flange 104 when optional T-inspection piece 100 is present, or otherwise may attach directly with inbound flange 28. Outboard flange 110 (when piece 106 is used) may be attached to further input piping, as will be understood by those of ordinary skill in the art, or such input piping may connect with flange 104 (when present), or flange 28 when neither such representative optional devices 100 and 106 are used.

In addition to automatic air release valve generally 16 at the top of tank 10, a purge valve 112 may be provided. An access opening generally 114 may be provided for media removal (if desired or required per a given installation). As with other embodiments, a blowdown or drain valve 18 may be used at the bottom of tank 10.

Dotted line pathway 115 of FIG. 6 represents an optional pathway by which water may be exited from the top of tank 10 and input through an optional bag filter 117. After flowing through such filter 117, the water flow 52' may be rejoined with water flow 52 for pumping. In such arrangements, material in the water with a relatively low specific gravity (that is, lower than 1.0) will float to the top of the tank and exit through a top opening in the water stream that passes through a bag filter and is removed. Clean water exiting the filter then can flow to the inlet side of a circulating pump.

FIG. 7A is an enlarged, partial (side perspective) view an exemplary embodiment which is a variation of the exemplary embodiment of present FIG. 6, with partial dotted-line representation of how the inflow and outflow piping is arranged relative to tank 10. FIG. 7B is a generally bottom view of the exemplary embodiment of present FIG. 7A, with partial dotted-line representation of the outflow piping relative to tank 10.

FIG. 7A shows a representative centerline 116 that existed for the outflow piping prior to inclusion of representative elbow piping 118, which resituated such outflow centerline into alignment 120 with the inflow piping as shown. Therefore, inflow flange 28 and outflow flange 94 are in axial alignment. FIG. 7B shows such structure from the bottom to show generally tank bottom 122 of tank 10 positioned laterally to the passing alignment of inflow flange 28 and outflow flange 94 due to inclusion per presently disclosed subject matter of additional piping 118. Such realignment of piping in general provides improvement by creating inline piping for ease of installation (whether original equipment or retrofit). Also, it helps to trap dirt by gravity. Such an arrangement can be built into the layout of a tank (as represented by FIGS. 7A and 7B), or added on with two elbows, as shown by FIG. 6.

Reference Numbers, in General, have been Used as Follows:
10—Hydronic tangential or In-Line air separator tank
12—Inlet, hydronic tangential or In-Line air separator tank
14—Outlet, hydronic tangential or In-Line air separator tank
16—Air release valve
18—Drain valve
20—Coalescing media—coiled wire mesh
22—Water flow path, air separator tank
24—Hole in top of air separator tank
26—Hole in bottom of air separator tank
28—Flanged connection, inlet, hydronic tangential or In-Line air separator tank
30—Flanged connection, outlet, hydronic tangential or In-Line air separator tank
32—Inside of hydronic tangential or In-Line air separator tank
34—Outside of hydronic tangential or In-Line air separator tank
36—Spacing between coils, coalescing media—coiled wire mesh
38—Wire mesh, coalescing media
40—Springiness of coiled wire mesh 42—Low pressure and speed of flow's vortex
44—Body, hydronic tangential or In-Line air separator tank
46—Water in tank
48—Vortex, water in tank
50—Flow into tank
52—Flow out of tank
54—Air, micro bubbles in water
56—Air, gathered
58—Dirt in water
60—Dirt, settled in bottom of tank
62—Dirt attached to coalescing media
64—Air attached to coalescing media
66—Coalesced air on media
68—Vertical centerline of the tank
70—Piping flange
72—Elbow pipe
74—Corner Bend in Last Wrap of mesh spiral
76—Wire, through wire mesh coil
78—Entrained air in the water
80—Coalesced dirt on coalescing media
82—Wire in wire mesh media
84—Spiral coil, coalescing media
86—Inlet screen
88—Outlet screen
90—Elbow flange
92—Further elbow
94—Further elbow flange
96—Further elbow flange
98—Outflow pipe section
100—T-inspection piece (optional)
102—T-inspection piece inboard flange
104—T-inspection piece outboard flange
106—Y-strainer piece (optional)
108—Y-strainer piece inboard flange
110—Y-strainer piece outboard flange
112—Purge valve
114—Access opening
115—Optional flowpath
116—Initial outflow centerline
117—Optional bag filter
118—Representative elbow piping
120—Repositioned inflow/outflow centerline
122—Tank bottom While the presently disclosed subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the presently disclosed subject matter as would be readily apparent to one of ordinary skill in the art.

What is claimed is:

1. A hydronic air separator, for use with a circulating or flowing fluid system for environmental control, for removing as present micro bubbles of air and micro particles of dirt from an associated fluid flow of such circulating fluid system, comprising:
a tank having an upper exhaust valve at the top of said tank, a lower drain valve at the bottom of said tank, a sidewall inlet, and a sidewall outlet, such that fluid is admitted to the tank through said inlet and flows out of said tank through said outlet, with said inlet and said outlet relatively positioned so that centrifugal force of fluid flow in said tank creates a flow vortex within said tank; and
a plurality of respective coalescing media having respective surfaces and trapped in said tank, such that micro bubbles of air and micro particles of dirt as present in the associated fluid flow when contacting said media stick to said media surfaces through surface adhesion and then coalesce into larger bubbles of air and clumps of dirt, with the larger bubbles of air floating off the media and out of the fluid to be released from said tank through said upper exhaust valve, and with the larger clumps of dirt falling off said media and onto the bottom of said tank to be expelled through said lower drain valve;
wherein said plurality of respective coalescing media comprise respective compressible coiled wire mesh sheets wrapped in a spiral and secured so as to limit expansion thereof, with said spiral creating a space between layers of the spirals, and with the length of the coil equal to the outside diameter of the coil.

2. A hydronic air separator as in claim 1, wherein:
said fluid comprises water; and
said upper exhaust valve comprises an automatic air release valve.

3. A hydronic air separator as in claim 1, wherein:
said tank comprises one of a tangential and in-line air separator tank; and
said sidewall inlet is located above said sidewall outlet.

4. A hydronic air separator as in claim 3, wherein said sidewall inlet and said sidewall outlet have respective flanges for connection to an associated circulating fluid system.

5. A hydronic air separator as in claim 4, further including elbow piping associated with said flange of said sidewall outlet to bring discharge therefrom into alignment with said flange of said sidewall inlet.

6. A hydronic air separator as in claim 1, wherein said plurality of respective coalescing media comprise respective pieces of at least one of bendable wire mesh, perforated sheets, expanded metal, expanded plastic, and molded plastic mesh, said coalescing media pieces having open areas to allow free fluid passage.

7. A hydronic air separator as in claim 6, wherein said coalescing media pieces comprise wire mesh pieces, respectively each comprising a continuous coil that is larger in diameter than the inside diameter of said tank inlet, and with spacing between coils equal to the opening of the mesh, so that each piece may be compressed to a size that is smaller in diameter than the inside diameter of said tank inlet.

8. A hydronic air separator as in claim 6, wherein said coalescing media pieces partially fill said tank.

9. A hydronic air separator as in claim 6, wherein said coalescing media pieces comprise wire mesh pieces comprising one of plastic wire mesh, fiberglass wire mesh, and metal wire mesh.

10. A hydronic air separator as in claim 1, wherein:
said plurality of respective coalescing media comprise respective bendable wire mesh pieces with open areas to allow free fluid passage, and having a size that is smaller than the inside diameter of said tank inlet; and
said air separator further includes screens placed over said tank inlet and said tank outlet to retain said coalescing media in said tank.

11. A hydronic air separator as in claim 1, wherein said plurality of respective coalescing media comprise respective compressible coiled wire mesh pieces, with each piece respectively comprising a bundle of smaller wire mesh coils banded together.

12. A hydronic air separator, for use with a circulating or flowing fluid system for environmental control, for removing as present micro bubbles of air and micro particles of dirt from an associated fluid flow of such circulating fluid system, comprising:
   a tank having an upper exhaust valve at the top of said tank, a lower drain valve at the bottom of said tank, a sidewall inlet, and a sidewall outlet, such that fluid is admitted to the tank through said inlet and flows out of said tank through said outlet, with said inlet and said outlet relatively positioned so that centrifugal force of fluid flow in said tank creates a flow vortex within said tank; and
   a plurality of respective coalescing media having respective surfaces and trapped in said tank, such that micro bubbles of air and micro particles of dirt as present in the associated fluid flow when contacting said media stick to said media surfaces through surface adhesion and then coalesce into larger bubbles of air and clumps of dirt, with the larger bubbles of air floating off the media and out of the fluid to be released from said tank through said upper exhaust valve, and with the larger clumps of dirt falling off said media and onto the bottom of said tank to be expelled through said lower drain valve;
   wherein said plurality of respective coalescing media comprise respective compressible coiled wire mesh sheets wrapped in a spiral with a corner bend in the last wrap of the spiral, to engage said sidewall inlet and outlet to prevent escape of said media from said tank.

13. A hydronic air separator as in claim 12, wherein:
   said fluid comprises water;
   said upper exhaust valve comprises an automatic air release valve;
   said tank comprises one of a tangential and in-line air separator tank;
   said sidewall inlet is located above said sidewall outlet;
   said sidewall inlet and said sidewall outlet have respective flanges for connection to an associated circulating fluid system; and
   said hydronic air separator further includes elbow piping associated with said flange of said sidewall outlet to bring discharge therefrom into alignment with said flange of said sidewall inlet.

14. A plurality of respective coalescing media having respective surfaces, said media for being trapped in a hydronic air separator tank having an upper exhaust valve at the top of such tank, a lower drain valve at the bottom of such tank, a sidewall inlet, and a sidewall outlet selectively positioned relative to such sidewall inlet, such that fluid admitted to the tank through such inlet and flowing out of the tank through such outlet creates a flow vortex due to centrifugal force of fluid flow in such tank, wherein said media surfaces are exposed to fluid flow within such tank such that micro bubbles of air and micro particles of dirt as present in the associated fluid flow when contacting said media adhere to said media surfaces through surface adhesion and then coalesce into larger bubbles of air and clumps of dirt, with the larger bubbles of air floating off the media and out of the fluid to be released from such tank through the upper exhaust valve thereof, and with the larger clumps of dirt falling off said media and onto the bottom of such tank to be expelled through the lower drain valve thereof, wherein said plurality of respective coalescing media comprise respective compressible coiled wire mesh sheets wrapped in a spiral and secured so as to limit expansion thereof, with said spiral creating a space between layers of the spirals, and with the length of the coil equal to the outside diameter of the coil.

15. A plurality of respective coalescing media as in claim 14, wherein said plurality of respective coalescing media comprise respective bendable wire mesh pieces with open areas to allow free fluid passage.

16. A plurality of respective coalescing media as in claim 15, wherein said wire mesh pieces respectively each comprise a continuous coil that is larger in diameter than the inside diameter of the associated tank inlet, and with spacing between coils equal to the opening of the mesh, so that each piece may be resiliently compressed to a size that is smaller in diameter than the inside diameter of the associated tank inlet.

17. A plurality of respective coalescing media as in claim 15, wherein said wire mesh pieces comprise one of plastic wire mesh, fiberglass wire mesh, metal wire mesh, perforated sheets, expanded metal, expanded plastic, or molded plastic mesh.

18. A plurality of respective coalescing media as in claim 14, wherein:
   said plurality of respective coalescing media comprise respective bendable wire mesh pieces with open areas to allow free fluid passage, and having a size that is smaller than the inside diameter of the associated tank inlet; and
   further including screens placed over the associated tank inlet and tank outlet to retain said coalescing media in the associated tank.

19. A plurality of respective coalescing media as in claim 14, wherein said plurality of respective coalescing media comprise respective compressible coiled wire mesh pieces, with each piece respectively comprising a bundle of smaller wire mesh coils banded together.

20. A plurality of respective coalescing media having respective surfaces, said media for being trapped in a hydronic air separator tank having an upper exhaust valve at the top of such tank, a lower drain valve at the bottom of such tank, a sidewall inlet, and a sidewall outlet selectively positioned relative to such sidewall inlet, such that fluid admitted to the tank through such inlet and flowing out of the tank through such outlet creates a flow vortex due to centrifugal force of fluid flow in such tank, wherein said media surfaces are exposed to fluid flow within such tank such that micro bubbles of air and micro particles of dirt as present in the associated fluid flow when contacting said media adhere to said media surfaces through surface adhesion and then coalesce into larger bubbles of air and clumps of dirt, with the larger bubbles of air floating off the media and out of the fluid to be released from such tank through the upper exhaust valve thereof, and with the larger clumps of dirt falling off said media and onto the bottom of such tank to be expelled through the lower drain valve thereof, wherein said plurality of respective coalescing media comprise respective compressible coiled wire mesh sheets wrapped in a spiral with a corner bend in the last wrap of the spiral, to engage the associated sidewall inlet and outlet to prevent escape of said media from the associated tank.

* * * * *